US010014711B2

(12) United States Patent
Iwabuchi (10) Patent No.: US 10,014,711 B2
(45) Date of Patent: Jul. 3, 2018

(54) MOBILE TERMINAL CHARGING DEVICE AND AUTOMOBILE USING SAME (71) Applicant: Panasonic Intellectual Property Management Co., Ltd., Osaka (JP)

(72) Inventor: Osamu Iwabuchi, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 141 days.

(21) Appl. No.: 15/026,988

(22) PCT Filed: Oct. 20, 2014

(86) PCT No.: PCT/JP2014/005299
§ 371 (c)(1),
(2) Date: Apr. 4, 2016

(87) PCT Pub. No.: WO2015/059912
PCT Pub. Date: Apr. 30, 2015

(65) Prior Publication Data
US 2016/0261135 A1 Sep. 8, 2016

(30) Foreign Application Priority Data
Oct. 21, 2013 (JP) .................................. 2013-218082

(51) Int. Cl.
*H02J 7/00* (2006.01)
*H02J 7/02* (2016.01)
(Continued)

(52) U.S. Cl.
CPC .............. *H02J 7/025* (2013.01); *B60R 16/03* (2013.01); *H02J 7/027* (2013.01); *H02J 7/1461* (2013.01);
(Continued)

(58) Field of Classification Search
CPC .................................. H02J 7/025; H02J 7/0044
(Continued)

(56) References Cited

U.S. PATENT DOCUMENTS 8,305,036 B2 * 11/2012 Toya ...................... H02J 7/025
320/107
8,362,744 B2 * 1/2013 Terao ..................... H01F 38/14
307/104

(Continued)

FOREIGN PATENT DOCUMENTS

| JP | 2009-189087 | 8/2009 |
| JP | 2009-247194 | 10/2009 |
| JP | 2013-106427 | 5/2013 |

OTHER PUBLICATIONS

International Search Report of PCT application No. PCT/JP2014/005299 dated Nov. 18, 2014.

*Primary Examiner* — Suresh Memula
(74) *Attorney, Agent, or Firm* — Wenderoth, Lind & Ponack, L.L.P.

(57) ABSTRACT

In a case where a mobile terminal charging device stops charging due to a decrease of charging efficiency, the cause thereof is, for example, that the mobile terminal is slightly moved on the upper surface of the installation plate, due to the vibration and inertia resulting from the driving of the automobile. In such a case, the mobile terminal charging device moves the charging coil to a portion corresponding to the position of the mobile terminal which is detected by the detector, using a drive unit, and thereafter resumes charging, in a condition that the position of the mobile terminal which is detected by the detector and the position of the charging coil are separated from each other by the second set distance or more.

5 Claims, 9 Drawing Sheets (51) Int. Cl.
  *H02J 50/80* (2016.01)
  *H02J 50/10* (2016.01)
  *B60R 16/03* (2006.01)
  *H02J 7/14* (2006.01)
  *H02J 50/90* (2016.01)
  *H02J 5/00* (2016.01)

(52) U.S. Cl.
  CPC .............. *H02J 50/10* (2016.02); *H02J 50/80* (2016.02); *H02J 50/90* (2016.02); *H02J 5/005* (2013.01)

(58) Field of Classification Search
  USPC ........................................................ 320/108
  See application file for complete search history.

(56) References Cited

U.S. PATENT DOCUMENTS

| | | | |
|---|---|---|---|
| 8,525,471 B2 * | 9/2013 | Thorsell | B60N 3/002 320/107 |
| 8,786,252 B2 | 7/2014 | Toya et al. | |
| 8,907,619 B2 * | 12/2014 | Shukuya | G12B 5/00 320/108 |
| 9,035,501 B2 * | 5/2015 | Azancot | H01F 38/14 307/104 |
| 9,124,106 B2 | 9/2015 | Toya et al. | |
| 9,407,327 B2 * | 8/2016 | Kirby | H04B 5/00 |
| 9,438,069 B2 * | 9/2016 | Hongo | H02J 17/00 |
| 9,685,825 B2 * | 6/2017 | Shimokawa | B60R 1/07 |
| 2013/0162202 A1 | 6/2013 | Wang | |

* cited by examiner

MOBILE TERMINAL CHARGING DEVICE AND AUTOMOBILE USING SAME

CROSS-REFERENCE TO RELATED APPLICATIONS

This application is a U.S. national stage application of the PCT International Application No. PCT/JP2014/005299 filed on Oct. 20, 2014, which claims the benefit of foreign priority of Japanese patent application 2013-218082 filed on Oct. 21, 2013, the contents all of which are incorporated herein by reference.

1. Field of the Invention

The present invention relates to a mobile terminal charging device that charges mobile terminals such as mobile phones, and an automobile using same.

2. Description of the Related Art

As mobile terminals such as mobile phones have significantly advanced functions, power consumption increases.

Therefore, charging is allowed to be performed in many places including the interior of an automobile, and so-called contactless charging without using a cable has become popular as a recent trend.

Thus, the following device has been proposed as a mobile terminal charging device satisfying such a demand.

In other words, the mobile terminal charging device includes a body case having an installation plate disposed on an upper surface thereof, a charging coil that is movably provided inside the body case so as to face the lower surface of the installation plate, a drive unit that moves the charging coil while facing the lower surface of the installation plate, and a controller that is connected to the drive unit and the charging coil.

Further, a plurality of detection coils is provided on the installation plate, as a position detection unit that detects the position of the mobile terminal which is installed on the upper surface of the installation plate (for example, PTL 1).

CITATION LIST

Patent Literature

PTL 1: Japanese Patent Unexamined Publication No. 2009-247194

SUMMARY OF INVENTION

An object of the present invention is to provide a mobile terminal charging device with excellent usability.

A mobile terminal charging device according to a first aspect of the present invention includes a body case, a detector, a charging coil, a drive unit, a charging controller, a charging communication unit, and a memory. An installation plate is disposed on an upper surface of the body case. The detector is provided on or below the installation plate, and detects a position of a mobile terminal that is present on an upper surface of the installation plate. The charging coil is movably disposed inside the body case, in a state of facing a lower surface of the installation plate. The drive unit moves the charging coil in a state of facing the lower surface of the installation plate. The charging controller is connected to the drive unit and the charging coil, and the charging communication unit is connected to the charging controller and communicates with the mobile terminal. The memory is connected to the charging controller. The memory stores a first set distance for determining whether or not a difference between a position of the mobile terminal and a position of the charging coil is a first distance or more and a second set distance for determining whether or not a difference between the position of the mobile terminal and the position of the charging coil is a second distance (less than the first distance) or more, as a reference to drive the charging coil using the drive unit, at the time of resumption of charging after the start of charging. If a charging stop request and a stop reason are acquired from the mobile terminal, the charging controller stops charging and sets a determination distance between a position of the mobile terminal and a position of the charging coil, the determination distance being a reference to resume the charging, to a first set distance or a second set distance, depending on the stop reason. If a distance between the position of the mobile terminal which is acquired from the detector and the position of the charging coil is greater than the determination distance, the charging controller moves the charging coil to a portion corresponding to the position of the mobile terminal which is detected by the detector, using the drive unit, and thereafter resumes charging. It is intended to achieve the intended purpose through this configuration.

Through the above configuration, it is possible to change a reference for determination as to whether or not to resume charging, depending on the reason for charging stop.

Further, since a drive unit moves the charging coil in a state of facing the lower surface of the installation plate, and thereafter charging is started, at the time of charging start, there is no concern about a location to place the mobile terminal, and excellent usability is achieved in this regard.

Further, at the time of charging stop after the start of charging, for example, in a case where it is determined that charging stop is caused by a reason that the charging efficiency of the mobile terminal is lower than the set efficiency value, and the position of the mobile terminal which is detected by the detector and the position of the charging coil are separated from each other by the second set distance or more, the charging coil is moved to a portion corresponding to the position of the mobile terminal which is detected by the detector, using the drive unit, thereafter charging is resumed, and excellent usability is achieved in this regard.

In other words, since the mobile terminal is moved during driving, position deviation from the charging coil is generated, the charging efficiency decreases significantly, and thus charging stop is often generated. Therefore, during driving, since the driver is unlikely to be aware of such a charging stop, when the driver realizes the charging stop, a situation where charging is not possible may frequently occur, and this is indicated as poor usability.

Therefore, in a case where the charging efficiency is decreased, charging stop is caused, for example, by a reason that the mobile terminal is slightly moved on the upper surface of the installation plate, due to the vibration and inertia resulting from the driving of the automobile. In this case, if the position of the mobile terminal which is detected by the detector and the position of the charging coil are separated from each other by the second set distance (less than the first set distance) or more, the charging coil is moved to a portion corresponding to the position of the mobile terminal which is detected by the detector, using the drive unit, and thereafter charging is resumed.

Therefore, for example, since charging is performed while the charging is not inadvertently stopped during the driving of the automobile or the like, excellent usability is achieved in this regard.

DETAILED DESCRIPTION OF THE PREFERRED EMBODIMENTS

Prior to a description of embodiments of the present invention, problems in the example of the prior art described above will be described. In the example of the prior art, if the mobile terminal is placed on the upper surface of the installation plate, the position of the placed mobile terminal is detected by the detection coil. Since the charging coil is moved to the detected position, and charging is started in the state, there is no concern about a location to place the mobile terminal, and thus a high evaluation is achieved in this regard.

In such a mobile terminal charging device, charging is started in a state where the charging coil is held in its position. Then, in a case of full charging or other problems (for example, an increase in the temperature of the mobile terminal, or a decrease in the charging efficiency) occur, charging is stopped.

Further, if the position of the mobile terminal is moved on the upper surface of the installation plate in a state where charging is stopped, it is determined that for example, another mobile terminal is placed, such that the charging coil is moved again to the position of the mobile terminal and charging is resumed.

For example, in a case where the mobile terminal charging device is installed in the interior of the automobile, there is a case where the mobile terminal is moved on the upper surface of the installation plate, in response to the driving of the automobile. In this case, if charging is resumed when the moving distance of the mobile terminal is the set distance or more, it is possible to prevent the resumption of inadvertent charging.

However, in a case where the reason for charging stop is caused by a reason that the mobile terminal is slightly moved on the upper surface of the installation plate, due to the vibration and inertia resulting from the driving of the automobile, due to a decrease of the charging efficiency, resumption of charging improves usability.

In other words, since the mobile terminal is moved so as to generate position deviation from the charging coil, the charging efficiency decreases significantly, and thus charging stop is often generated. Therefore, during driving, since the driver is unlikely to be aware of such a charging stop, when the driver realizes the charging stop, a situation where charging is not possible may frequently occur, and this is indicated as poor usability.

Hereinafter, an example in which a mobile terminal charging device according to an exemplary embodiment of the present invention is installed in the interior of an automobile will be described with reference to the accompanying drawings.

Figure 1:
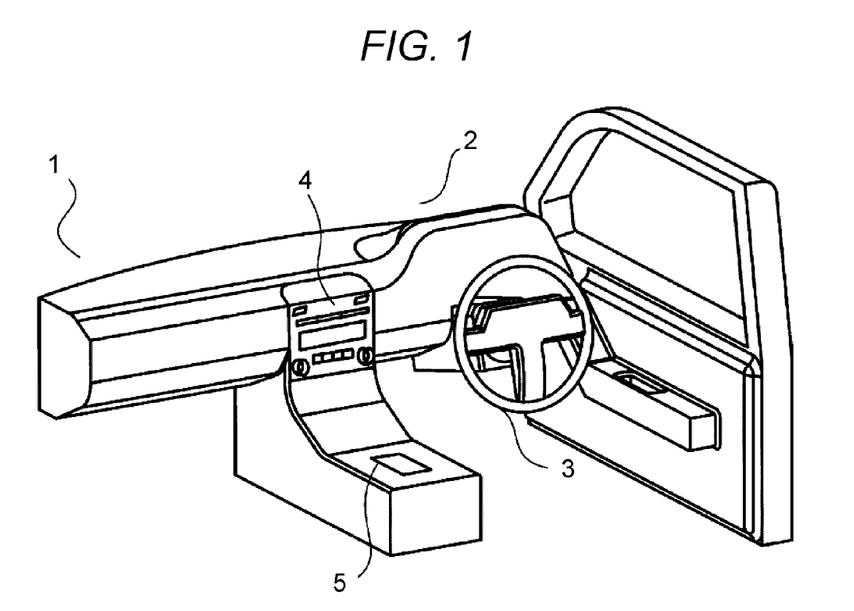
FIG. 1 is a perspective view illustrating a state where a mobile terminal charging device according to an exemplary embodiment of the present invention is provided in an interior of an automobile.

In FIG. 1, steering wheel 3 is provided in front of interior 2 of automobile 1. Further, electronic device 4 that plays music and displays an image such as a car navigation image is provided on the side of steering wheel 3. Further, mobile terminal charging device 5 is provided in the rear of electronic device 4 in automobile interior 2.

As illustrated in FIGS. 2 to 8, mobile terminal charging device 5 includes box-like body case 7 having installation plate 6 placed on the upper surface thereof, charging coil 8 that is provided movably in a horizontal direction in a state of facing the lower surface of installation plate 6, inside body case 7, drive unit 9 that moves charging coil 8 in the horizontal direction so as to face the lower surface of installation plate 6, and a charging controller (10 in FIG. 9) connected to drive unit 9 and charging coil 8.

Hereinafter, respective units will be described in detail. First, installation plate 6 will be described.

Figure 6:
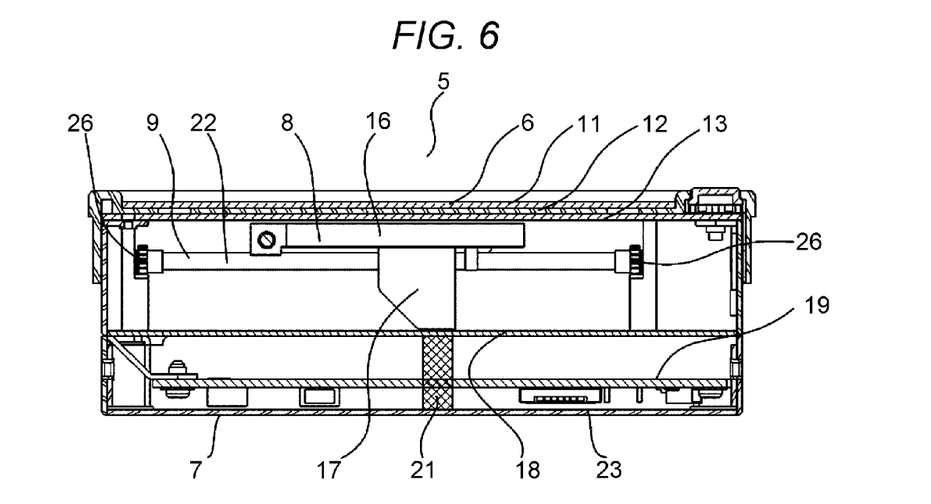
FIG. 6 is a cross-sectional view of a broken-line part of the mobile terminal charging device illustrated in FIG. 2.
Figure 7:
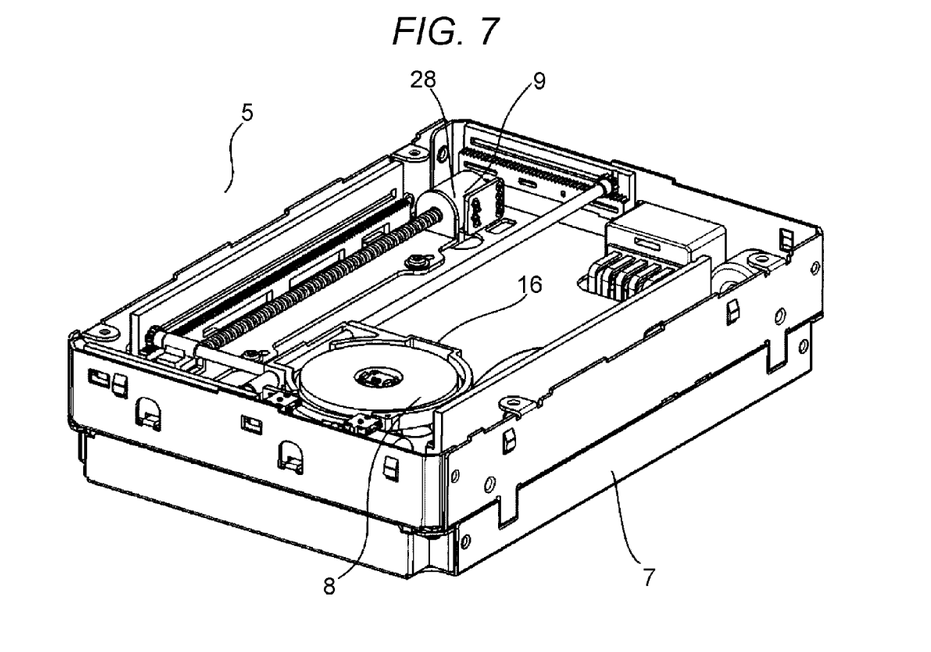
FIG. 7 is a perspective view illustrating another state of the mobile terminal charging device illustrated in FIG. 2.
Figure 8:
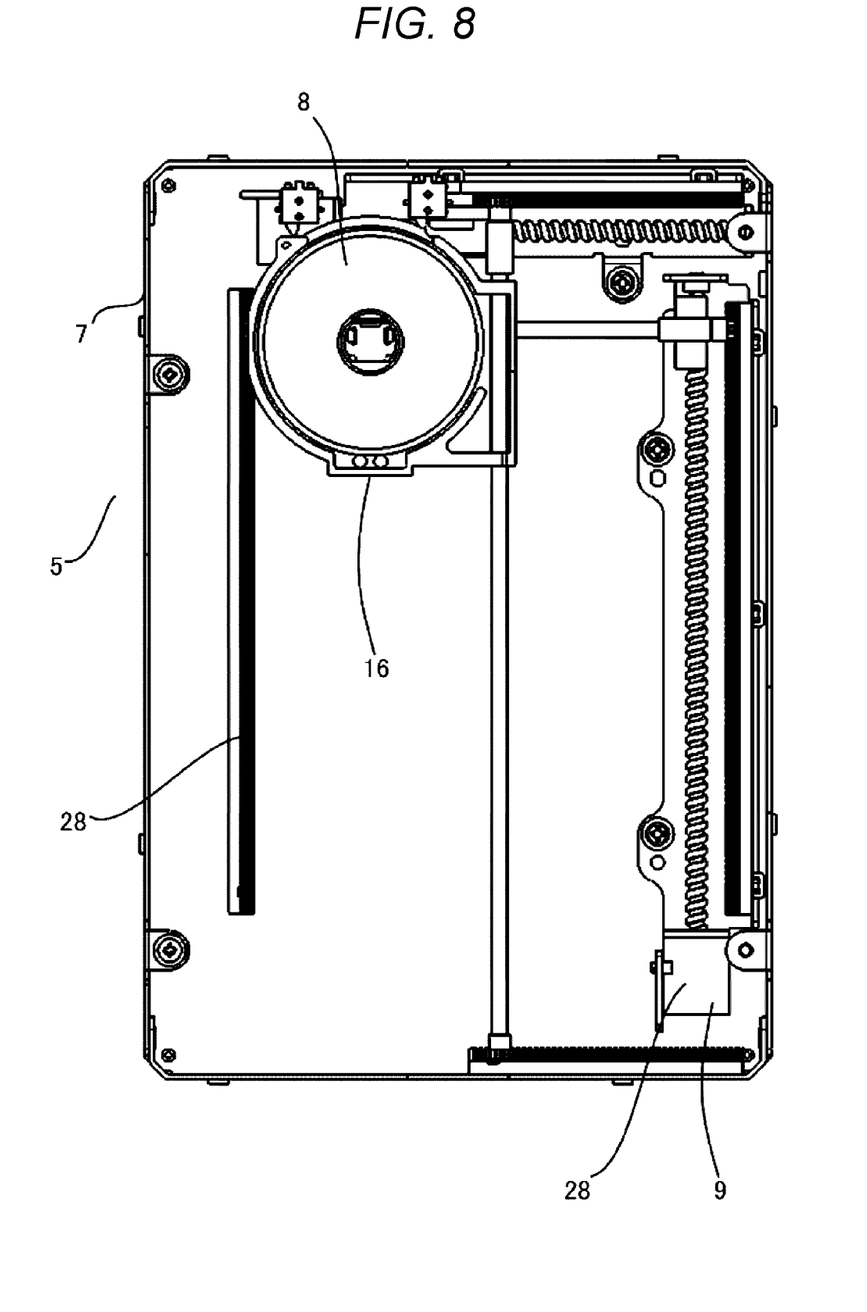
FIG. 8 is a plan view of the mobile terminal charging device that is in a state illustrated in FIG. 7.

As illustrated in FIG. 6, installation plate 6 is formed by superimposing surface plate 11, intermediate plate 12, and back plate 13.

Each of surface plate 11 and back plate 13 is made of synthetic resin, and intermediate plate 12 is made of ceramic. In other words, installation plate 6 is configured to allow the magnetic flux from charging coil 8 to pass through in a direction of mobile terminal 15 placed on installation plate 6 of FIG. 3.

Figure 9:
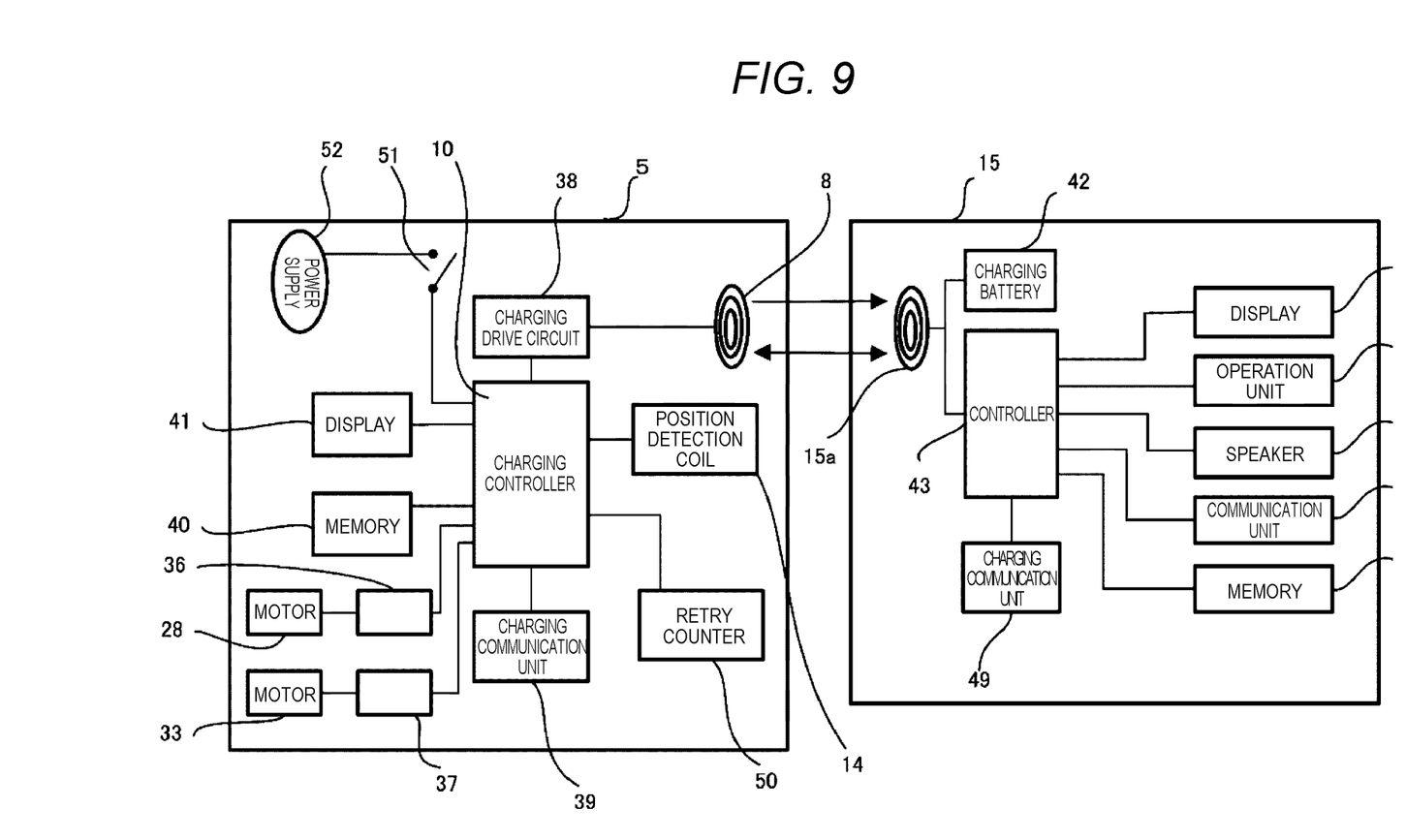
FIG. 9 is a control block diagram of the mobile terminal charging device illustrated in FIG. 2.

Further, position detection coil 14 of FIG. 9 is provided on the surface of intermediate plate 12.

Figure 3:
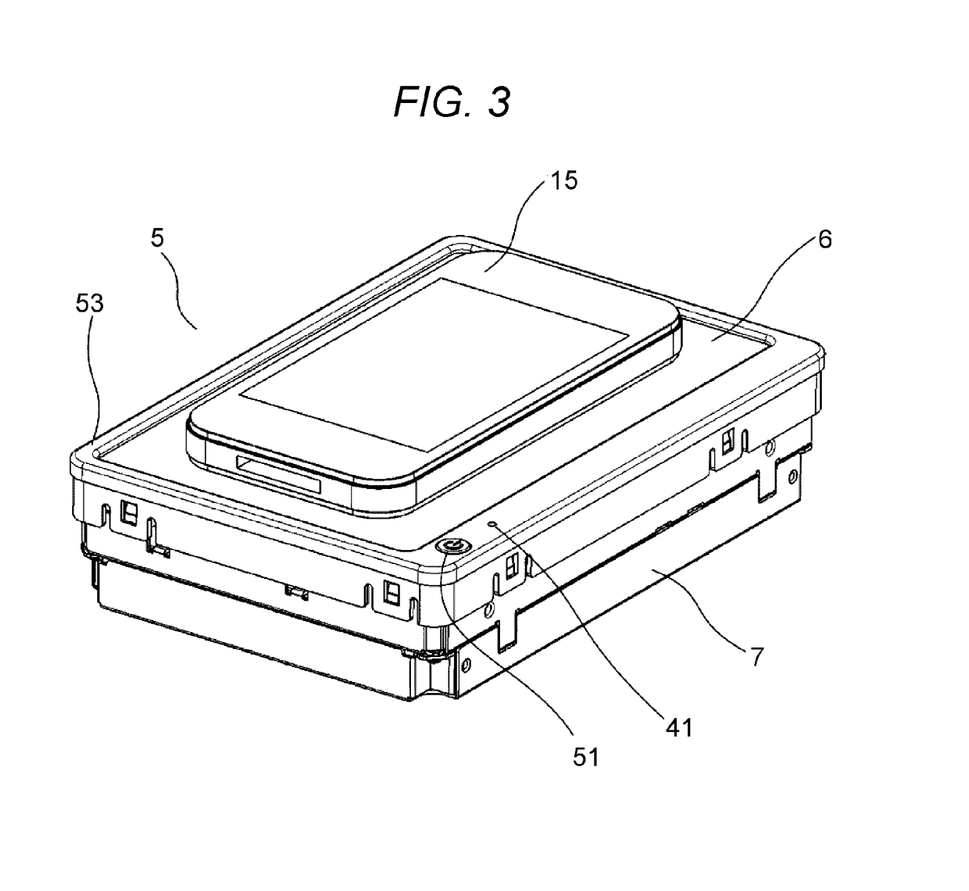
FIG. 3 is a perspective view illustrating a state where a mobile terminal is placed on the mobile terminal charging device illustrated in FIG. 2.

Position detection coil 14 is used in PTL 1 (Japanese Patent Unexamined Publication No. 2009-247194), and is configured to detect a position on the upper surface of installation plate 6 where mobile terminal 15 is placed, as in FIG. 3. In other words, position detection coil 14 is an example of a detector which is provided on installation plate 6, or below installation plate 6, and detects the position of mobile terminal 15 which is present on the upper surface of installation plate 6.

The present exemplary embodiment is configured such that first, a position on the upper surface of installation plate 6 where mobile terminal 15 is placed, as in FIG. 3, is detected using position detection coil 14, next, charging coil 8 is moved to a position facing the charging coil (15a in FIG. 9) of mobile terminal 15 by drive unit 9, and thereafter, charging is started.

Next, a charging coil 8 part will be described. As will be understood from FIGS. 4 and 5, charging coil 8 is formed by turning a lead wire into an annular shape a plurality of times, and the circumference side and the lower surface side are held in a state in which they are covered with holder 16 made of synthetic resin.

Further, support leg 17 extending downward towards charging coil 8 is integrally formed of synthetic resin on the lower surface of holder 16, as in FIG. 6.

In addition, a gap of 0.3 mm is provided between the lower surface of support leg 17 and the upper surface of metal support plate 18 that is disposed below support leg 17. Therefore, the lower surface of support leg 17 does not come into contact with the upper surface of support plate 18 during movement of charging coil 8 in a normal state.

Control board 19, and lower plate 20 of body case 7 are disposed below support plate 18, and support body 21 passing through control board 19 is provided between the lower surface of support plate 18 and the upper surface of lower plate 20.

Figure 2:
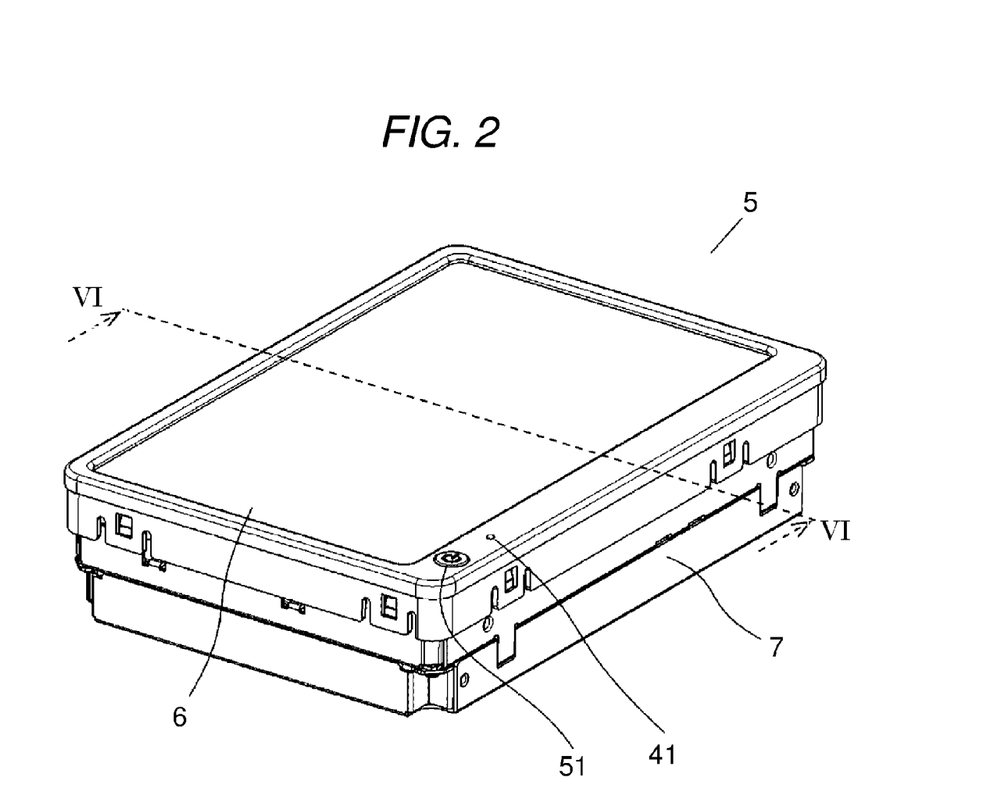
FIG. 2 is a perspective view of the mobile terminal charging device illustrated in FIG. 1.

In other words, as in FIG. 2, in a state where mobile terminal 15 is not placed on installation plate 6 of body case 7, installation plate 6 is in a state of being exposed in automobile interior 2 as in FIG. 1.

Therefore, a situation also occurs in which the user puts their hand on installation plate 6 by mistake, and in this case, excessive weight may be applied depending on installation plate 6.

Figure 4:
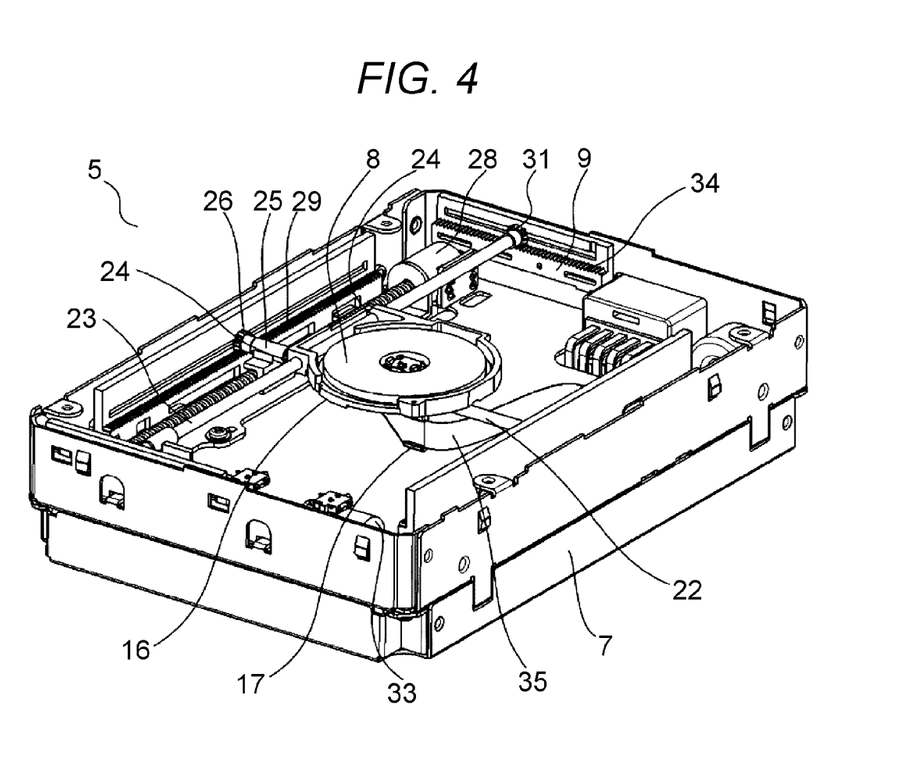
FIG. 4 is a perspective view illustrating a state where a part of the mobile terminal charging device illustrated in FIG. 2 is removed.
Figure 5:
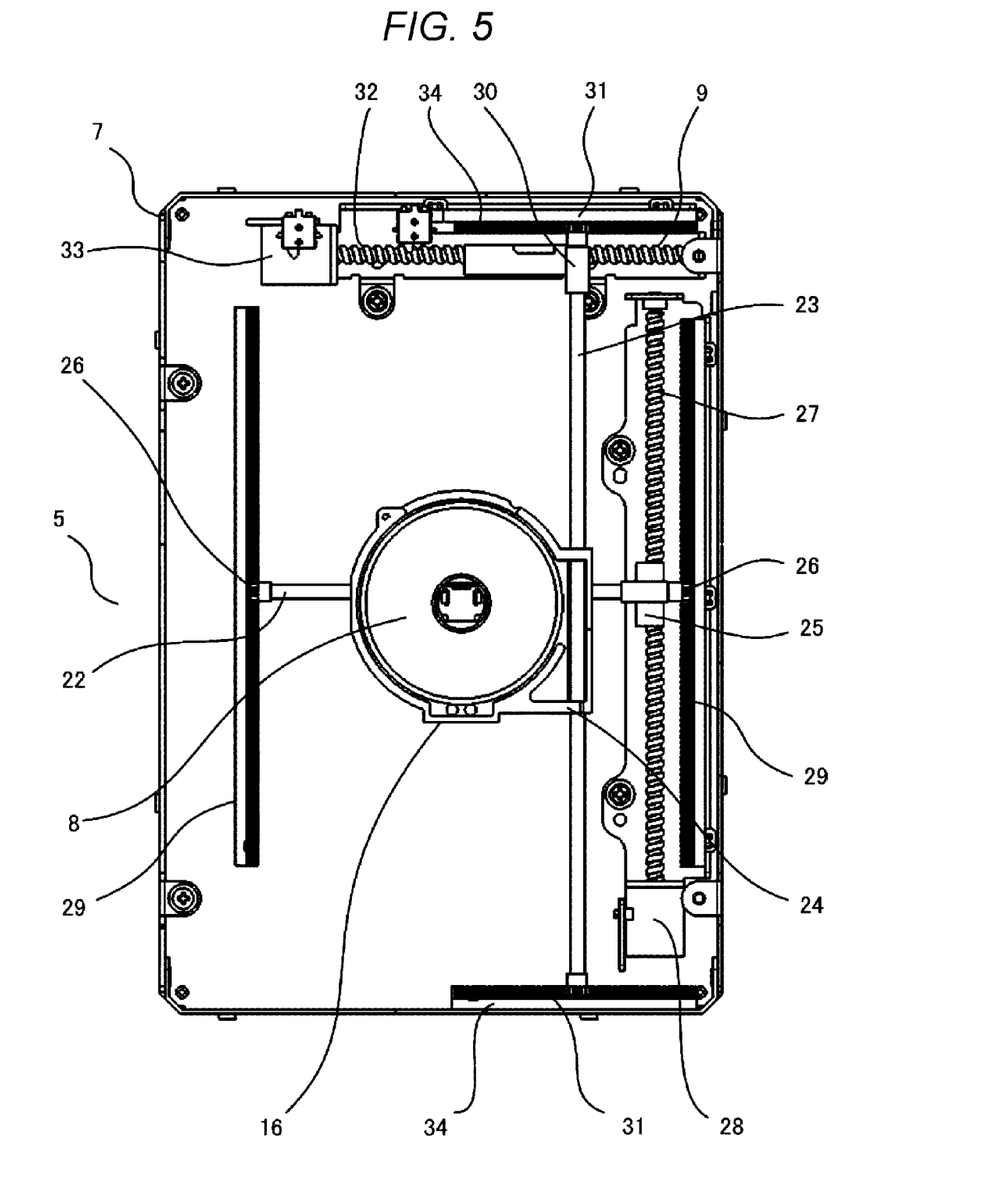
FIG. 5 is a plan view of the mobile terminal charging device that is in a state illustrated in FIG. 4.

Thus, in the present exemplary embodiment, as illustrated in FIGS. 4 to 6, charging coil 8 is moved to the center of body case 7, and the above-mentioned excessive weight is supported by charging coil 8, holder 16, support leg 17, and support plate 18.

In other words, if installation plate 6 is in a state where excessive weight is applied thereto, installation plate 6 is curved downward slightly, but in this state, charging coil 8, holder 16, and support leg 17 also move downward, and the lower surface of support leg 17 comes into contact with the upper surface of support plate 18.

As a result, the excessive weight is supported by support plate 18 through installation plate 6, charging coil 8, holder 16, and support leg 17, and thus it is possible to suppress damage to installation plate 6 and charging coil 8.

In the present exemplary embodiment, it is configured such that the lower surface of support plate 18 is supported by lower plate 20 of body case 7 through support body 21 in order to increase the strength against the excessive weight.

Further, if such excessive weight is removed, installation plate 6 elastically returns upward, and charging coil 8 and holder 16 also return upward by X-axis direction drive shaft 22 and Y-axis direction drive shaft 23 returning elastically, such that the lower surface of support leg 17 is disposed with a gap on the upper surface of support plate 18.

This does not become an obstacle during the following movement of charging coil 8.

Next, drive unit 9 will be described. As illustrated in FIGS. 4 and 5, drive unit 9 includes X-axis direction drive shaft 22, and Y-axis direction drive shaft 23, and the respective intermediate portions of X-axis direction drive shaft 22 and Y-axis direction drive shaft 23 are engaged with holder 16, in the outside of the charging coil hold unit of holder 16.

In other words, a through hole (not illustrated) through which X-axis direction drive shaft 22 passes and through hole 24 through which Y-axis direction drive shaft 23 passes are provided in holder 16, with a predetermined interval in the vertical direction, in a cross-state, and X-axis direction drive shaft 22 and Y-axis direction drive shaft 23 pass through each other and are engaged.

Further, worm wheel 25 is provided on one end side of X-axis direction drive shaft 22, and gear 26 is provided on one end and gear 26 is also provided on the other end.

Worm wheel 25 is engaged with worm 27, and worm 27 is connected to motor 28. Further, gears 26 on both sides are respectively engaged with gear plate 29. Therefore, if motor 28 is driven, worm 27 rotates such that worm wheel 25 and X-axis direction drive shaft 22 move in an X-axis direction, and thus charging coil 8 moves in the X-axis direction.

Further, worm wheel 30 is provided on one end side of Y-axis direction drive shaft 23, and gear 31 is provided on one end and gear 31 is also provided on the other end. Worm wheel 30 is engaged with worm 32, and worm 32 is connected to motor 33. Further, gears 31 on both sides are respectively engaged with gear plate 34. Therefore, if motor 33 is driven, worm 32 rotates such that worm wheel 30 and Y-axis direction drive shaft 23 move in a Y-axis direction, and thus charging coil 8 moves in the Y-axis direction.

Flexible wiring 35 illustrated in FIG. 4 is provided for energizing charging coil 8, and the end of flexible wiring 35 is fixed to the side of support leg 17 described above.

Further, as illustrated in FIG. 9, motor 28 is connected to charging controller 10 through X-axis motor controller 36, or motor 33 is connected thereto through Y-axis motor controller 37.

Further, charging coil 8 is connected to charging controller 10 through charging drive circuit 38, and charging communication unit 39 that communicates information with position detection coil 14 and mobile terminal 15 installed on the upper surface of installation plate 6, memory 40, display 41 that informs the state of charging are connected to charging controller 10.

Further, memory 40 stores respective pieces of data of a first set distance (for example 10, mm) when a difference between the position of mobile terminal 15 and the position of charging coil 8 is a first distance or more, and a second set distance (for example, 6 mm) when a difference between the position of mobile terminal 15 and the position of charging coil 8 is a second distance (smaller than the first distance) or more, as a reference for drive unit 9 to drive charging coil 8.

Further, since mobile terminal 15 is a general device, it includes terminal charging coil 15a, and charging battery 42 and controller 43 which are connected to terminal charging coil 15a.

Further, display 44, operation unit 45, speaker 46, communication unit 47, memory 48, and charging communication unit 49 are connected to controller 43.

Charging communication unit 49 communicates various types of information on charging with charging communication unit 39 of mobile terminal charging device 5, conforming to wireless power consortium (WPC).

For example, a charging request, a charging capacity, and the like from the mobile terminal 15 side are transmitted from charging communication unit 49 of mobile terminal 15 to charging communication unit 39 of mobile terminal charging device 5, and thus the optimal charging of charging battery 42 of mobile terminal 15 is intended to be performed.

Further, when charging battery 42 is fully charged, the charging is stopped, due to the charging information transmission.

Further, charging efficiency is measured on mobile terminal charging device 5 side (or mobile terminal 15 side), and if the charging efficiency of mobile terminal 15 is lower than the set efficiency value, the charging is stopped.

For example, when mobile terminal 15 is moved on the upper surface of installation plate 6, due to the vibration and inertia resulting from the driving of automobile 1, charging coil 8 of mobile terminal charging device 5 and terminal charging coil 15a of mobile terminal 15 enter a state of being shifted, and as a result, the charging efficiency of mobile terminal 15 is lower than the set efficiency value, such that in this case, charging is stopped once.

Although the features of the present exemplary embodiment will be described in more detail below, for example, when charging stop is caused by a reason that charging efficiency of mobile terminal 15 is lower than the set efficiency value, charging is intended to be resumed a predetermined number of times (for example, two times).

Further, as a condition to start re-charging, charging coil 8 of mobile terminal charging device 5 and terminal charging coil 15a of mobile terminal 15 are shifted, and the second set distance (6 mm) less than the first set distance (10 mm) which is a reference at the time of full charging is used as the reference for the deviation at this time.

Specifically, in a case where the position of mobile terminal 15 that is detected by position detection coil 14 and the position of charging coil 8 are separated from each other by the second set distance (6 mm) or more, it is configured such that first, drive unit 9 moves charging coil 8 to a portion corresponding to the position of mobile terminal 15 which is detected by position detection coil 14, and thereafter charging is resumed (retried).

Even after the charging is resumed, a determination as to whether or not the charging efficiency of mobile terminal 15 is lower than the set efficiency value is performed. In the present exemplary embodiment, charging is intended to be resumed (retried), for example, two times, in this state (charging efficiency decrease).

In order to perform such an operation, retry counter 50 is connected to charging controller 10 of FIG. 9.

In other words, charging controller 10 determines that charging stop is caused by a reason that the charging efficiency of mobile terminal 15 is lower than the set efficiency value, based on charging communication information from charging communication units 39, 49, after the start of charging mobile terminal 15.

In this case, a counter input to retry counter 50 is performed, and if the count number of retry counter 50 is the set count value (above twice) or more, it is configured to end resumption of the power supply to charging coil 8.

If charging stop is not caused by a reason that charging efficiency of mobile terminal 15 is lower than a set efficiency value, position detection coil 14 detects the position of mobile terminal 15 and the position of charging coil 8.

Only when the detected position is away by the first set distance (10 mm) or more, drive unit 9 moves charging coil 8 to a portion corresponding to the position of mobile terminal 15 which is detected by position detection coil 14, and thereafter charging is resumed.

Hereinafter, such an operation will be described in detail. First, if power switch 51 of FIG. 9 and FIG. 2 is turned on (S1 in FIG. 10), power is supplied from power supply 52 to charging controller 10.

Figure 10:
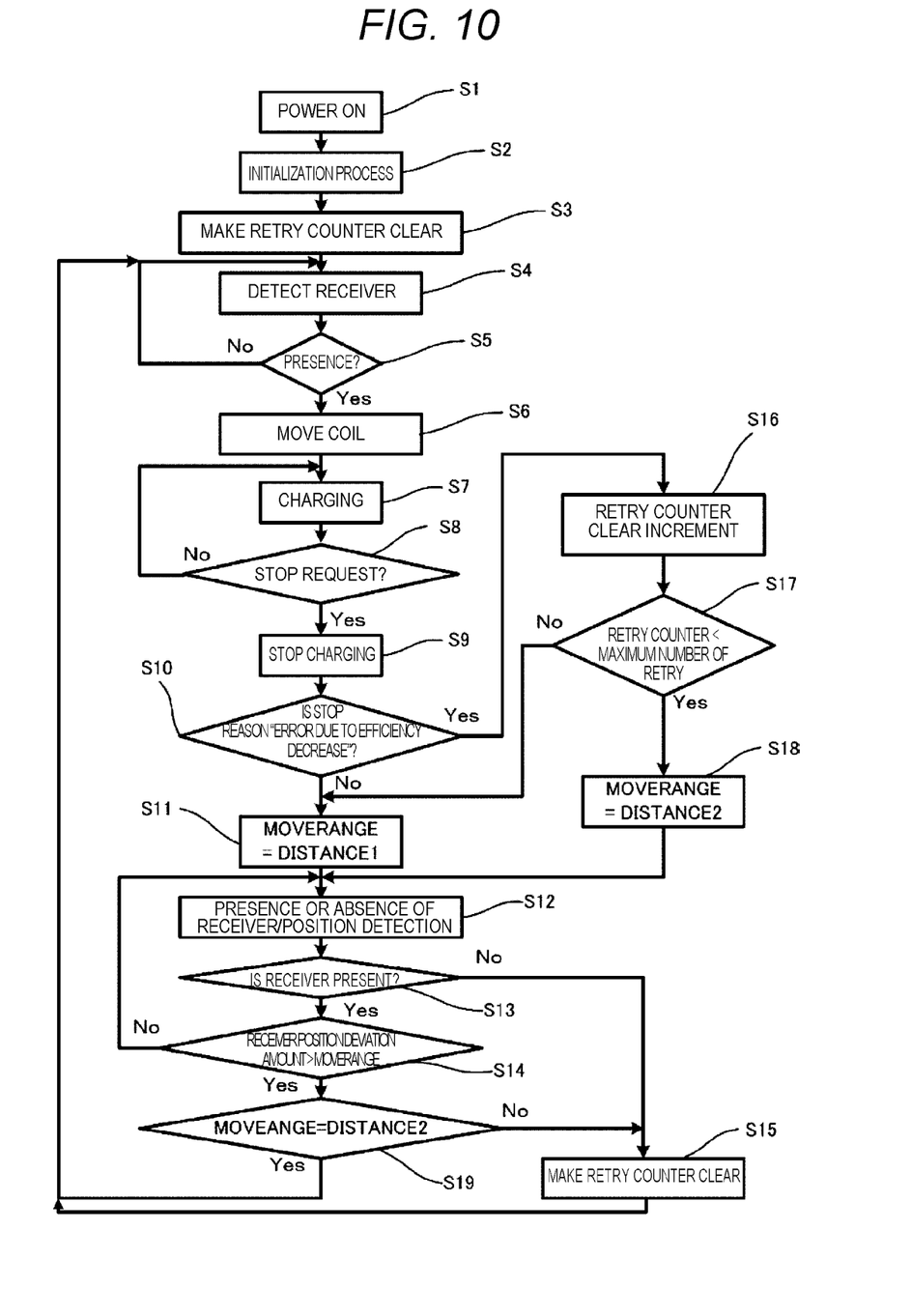
FIG. 10 is an operation flowchart of the mobile terminal charging device illustrated in FIG. 2.

Thus, charging controller 10 checks whether or not charging coil 8 is present at an intermediate point as in FIG. 4, as an initialization process (S2 in FIG. 10).

The checking can be determined based on the driving amounts of motors 28 and 33 that are stored in X-axis motor controller 36 and Y-axis motor controller 37.

In the case where it is determined that charging coil 8 is not present at the midpoint, charging coil 8 is moved to the midpoint by charging controller 10, and is in a charging standby state at the midpoint.

Next, retry counter 50 is in a clear state (S3 in FIG. 10).

Thereafter, charging controller 10 detects a position on the upper surface of installation plate 6 in which mobile terminal 15 is placed, using position detection coil 14, as in FIG. 3 (S4 and S5 in FIG. 10).

The location where mobile terminal 15 is placed is actually the location of terminal charging coil 15a built into mobile terminal 15.

Thereafter, charging controller 10 drives motors 28 and 33 using X-axis motor controller 36 and Y-axis motor controller 37 so as to move charging coil 8 to the detected position of terminal charging coil 15a that is provided in mobile terminal 15 (S6 in FIG. 10), and thereafter, starts charging using charging drive circuit 38 (S7 in FIG. 10).

Further, during charging, it is determined whether or not charging needs to be continued (whether or not charging is completed) by the same operation as in Japanese Patent Unexamined Publication No. 2009-247194 (S8 in FIG. 10), and if charging is completed (full charging), charging controller 10 ends the charging operation (S9 in FIG. 10).

In other words, in the present exemplary embodiment, a charging request, a charging capacity, and the like from mobile terminal 15 side are transmitted from charging communication unit 49 of mobile terminal 15 to charging communication unit 39 side of mobile terminal charging device 5, and thus the optimal charging of charging battery 42 of mobile terminal 15 is intended to be performed.

Further, in a case where such charging stop communication is performed, charging controller 10 (or mobile terminal 15 side) of mobile terminal charging device 5 determines whether or not the charging stop is caused by a reason that the charging efficiency of mobile terminal 15 is lower than the set efficiency value.

For example, when mobile terminal 15 is moved on the upper surface of installation plate 6, due to the vibration and inertia resulting from the driving of automobile 1, charging coil 8 of mobile terminal charging device 5 and terminal charging coil 15a of mobile terminal 15 enter a state of being shifted.

As a result, since the charging efficiency of mobile terminal 15 is lower than the set efficiency value, in this case, charging is stopped once.

Further, in this case (where charging efficiency of mobile terminal 15 is lower than the set efficiency value), in a condition that the position of mobile terminal 15 which is detected by position detection coil 14 and the position of charging coil 8 are separated from each other by the second set distance (6 mm) or more, first, drive unit 9 moves charging coil 8 to a portion corresponding to the position of mobile terminal 15 which is detected by position detection coil 14, and thereafter charging is resumed (retried).

Even after the charging is resumed, a determination as to whether or not the charging efficiency of mobile terminal 15 is lower than the set efficiency value is performed, but in the present exemplary embodiment, charging is intended to be resumed (retried), for example, two times, in this state (charging efficiency decrease).

If charging is stopped in S9 of FIG. 10, charging controller 10 determines whether or not charging stop is caused by "a reason that charging efficiency of mobile terminal 15 is lower than a set efficiency value", and if the result is NO, next, whether or not the position of mobile terminal 15 which is detected by position detection coil 14 and the position of charging coil 8 are separated from each other by the first set distance (10 mm) or more is determined as a condition for the start of charging (S10, S11 in FIG. 10).

This state is, for example, a state where full charging is performed, and at this time, then, the presence or absence and the position of mobile terminal 15 are detected by position detection coil 14 (S12 in FIG. 10).

For example, since mobile terminal 15 is present in the same position on installation plate 6 in the case where it becomes fully charged as described above, it becomes "Presence" in S13 of FIG. 10, and next, since the position of mobile terminal 15 and the position of charging coil 8 are not separated from each other by the first set distance (10 mm) or more in S14 of FIG. 10, it becomes "No" in S12 of FIG. 10, and next, the process returns to S12 of FIG. 10, and circulates S12, 13, 14 of FIG. 10.

In other words, in the full charging, the charging stop state continues.

However, even in this fully charged state, in a case where another mobile terminal 15 is placed on installation plate 6, in S13 of FIG. 10, the state where mobile terminal 15 does not exist occurs, such that retry counter 50 is cleared (S15 of FIG. 10), and then the process returns to S4 of FIG. 10.

That is, in this process (S4 of FIG. 10), the charging operation is started from the position of detecting next mobile terminal 15.

On the contrary, if charging stop is caused by "a reason that charging efficiency of mobile terminal 15 is lower than a set efficiency value", it becomes "Yes" in S10 of FIG. 10, first, the count input is performed to retry counter 50 (S16 of FIG. 10), next, a determination as to whether or not the count number of retry counter 50 is the set count value (for example, three times) or more is performed (S17 of FIG. 10).

For example, when mobile terminal 15 is moved on the upper surface of installation plate 6, due to the vibration and inertia resulting from the driving of automobile 1, charging coil 8 of mobile terminal charging device 5 and terminal charging coil 15a of mobile terminal 15 enter a state of being shifted, and as a result, the charging efficiency of mobile terminal 15 is lower than the set efficiency value, such that in this case, charging is stopped once.

However, if charging is stopped in a fine-moving state of mobile terminal 15, charging of mobile terminal 15 in automobile 1 becomes hard realistically.

Therefore, in the present exemplary embodiment, it is configured to resume the charging when the fine movement of mobile terminal 15 has occurred up to two times.

In other words, if the number of fine movements of mobile terminal 15 is equal to 2 times, in a case where the position of mobile terminal 15 which is detected by position detection coil 14 and the position of charging coil 8 are separated from each other by the second set distance (6 mm) or more, it is configured such that drive unit 9 moves charging coil 8 to a portion corresponding to the position of mobile terminal 15 which is detected by position detection coil 14, and thereafter charging is resumed (retried) (S17 and S18 in FIG. 10).

In other words, at this time, in subsequent S12 of FIG. 10, "presence" of mobile terminal 15 is detected by position detection coil 14, and next, since "mobile terminal 15 presence" in (S13 of FIG. 10), the process proceeds to S14 of FIG. 10.

Since S14 of FIG. 10 is in a state of passing through S18 of FIG. 10 at this time, the set distance is the second set distance (6 mm), in the process (S14 of FIG. 10), a determination as to whether or not the positions of mobile terminal 15 and charging coil 8 are separated from each other by the second set distance (6 mm) or more is performed.

In other words, if charging stop is caused by "a reason that the charging efficiency of mobile terminal 15 is lower than the set efficiency value", a condition of start of re-charging is that the position of mobile terminal 15 and the position of charging coil 8 are separated from each other by the second set distance (6 mm) or more.

This is likely to occur during driving of automobile 1, as described above, and since mobile terminal 15 finely moves on the upper surface of installation plate 6 at this time, separation by the second set distance (6 mm) or more is set as the setting condition.

If the position of mobile terminal 15 and the position of charging coil 8 are separated from each other by the second set distance (6 mm) or more, S14 of FIG. 10 is "Yes", the process proceeds to S19 of FIG. 10, in this process (S19 of FIG. 10), after it is confirmed that the setting condition is the second set distance (6 mm) (Yes), the process returns to S4 of FIG. 10, and a recharging operation is performed.

In other words, in a state where mobile terminal 15 is finely moved on the upper surface of installation plate 6, resulting from the driving of automobile 1, it does not continuously become a charging stop state, and has excellent usability.

However, even though charging is resumed in this way, "a reason is that the charging efficiency of mobile terminal 15 is lower than the set efficiency value", such that charging is stopped.

For example, in a state where a foreign object is interposed between mobile terminal 15 and the upper surface of installation plate 6, even if charging is started again, "the reason is that the charging efficiency of mobile terminal 15 is lower than the set efficiency value", and charging is stopped.

At this time, a counter input to retry counter 50 is performed (S16 of FIG. 10) in S16 of FIG. 10, and next, a determination as to whether or not the count number of retry counter 50 is the set count value (for example, three times) or more is performed (S17 of FIG. 10), and thereafter, charging is resumed through S18, S12, S13, S14, S19, S4, and the like of FIG. 10.

However, even if charging is resumed two times, in a state where a foreign object is interposed between mobile terminal 15 and the upper surface of installation plate 6, "the reason is that the charging efficiency of mobile terminal 15 is lower than the set efficiency value", and thus the charging is stopped.

Therefore, in the present exemplary embodiment, in a case where the charging resumption is caused by "a reason that the charging efficiency of mobile terminal 15 is lower than the set efficiency value", if the recharging operation becomes the third time, a determination as to whether or not the count number of retry counter 50 is the set count value (for example, three times) or more is "No" (S17 of FIG. 10), next, such that the process proceeds to S11 of FIG. 10.

Then, as determination for recharging, a determination as to whether or not the position of mobile terminal 15 which is detected by position detection coil 14 and the position of charging coil 8 are separated from each other by the first set distance (10 mm) or more is used (S11 of FIG. 10).

Then, through S11, S12, S13 of FIG. 10, since the position of mobile terminal 15 which is detected by position detection coil 14 and the position of charging coil 8 are not separated from each other by the first set distance (10 mm) or more in S14 of FIG. 10, the process returns to S12 of FIG. 10, and charging is stopped.

In other words, in a state where a foreign object is interposed between mobile terminal 15 and the upper surface of installation plate 6, charging is stopped.

As described above, in the present exemplary embodiment, since drive unit 9 moves charging coil 8 in a state of facing the lower surface of installation plate 6, and thereafter charging is started, at the time of charging start, there is no concern about a location to place mobile terminal 15, and excellent usability is achieved in this regard.

Further, at the time of charging stop after the start of charging, in a case where it is determined that charging stop is caused by a reason other than the reason that the charging efficiency of mobile terminal 15 is lower than the set efficiency value, and the position of mobile terminal 15 which is detected by position detection coil 14 and the position of charging coil 8 are separated from each other by the first set distance (10 mm) or more, it is configured such that drive unit 9 moves charging coil 8 to a portion corresponding to the position of mobile terminal 15 which is detected by position detection coil 14, and thereafter charging is resumed.

Therefore, in a state where charging is stopped, in a case where another mobile terminal 15 is placed on the upper surface of installation plate 6, again, charging coil 8 is moved to the position of mobile terminal 15, charging is resumed, and excellent usability is achieved in this regard.

Further, at the time of charging stop after the start of charging, in a case where it is determined that charging stop is caused by a reason that the charging efficiency of mobile terminal 15 is lower than the set efficiency value, and the position of mobile terminal 15 which is detected by position detection coil 14 and the position of charging coil 8 are separated from each other by the second set distance (6 mm) or more, drive unit 9 moves charging coil 8 to a portion corresponding to the position of mobile terminal 15 which is detected by position detection coil 14, and thereafter charging is resumed. Therefore, excellent usability is achieved in this regard.

In other words, since mobile terminal 15 is moved during driving so as to generate position deviation from charging coil 8, the charging efficiency decreases significantly, and thus charging is likely to be stopped. Therefore, the driver is not aware of such a charging stop during driving, and when the driver realizes the charging stop, the charging cannot be performed, and this is indicated as poor usability.

Therefore, in the present exemplary embodiment, for example, in a case where the charging efficiency is decreased, the reason for charging stop is caused by a reason that the mobile terminal is slightly moved on the upper surface of the installation plate, due to the vibration and inertia resulting from the driving of the automobile.

In this case, in a condition that the position of mobile terminal 15 which is detected by position detection coil 14 and the position of charging coil 8 are separated from each other by the second set distance (6 mm) or more, it is configured such that drive unit 9 moves charging coil 8 to a portion corresponding to the position of mobile terminal 15 which is detected by position detection coil 14, and thereafter charging is resumed.

Therefore, for example, since charging is performed while the charging is not inadvertently stopped during driving of the automobile or the like, excellent usability is achieved.

In addition, position detection coil 14 is installed on installation plate 6 in the above embodiment, but position detection coil 14 may be installed below installation plate 6.

As described above, in the mobile terminal charging device according to an embodiment of the present invention, since a drive unit moves the charging coil in a state of facing the lower surface of the installation plate, and thereafter charging is started, at the time of charging start, there is no concern about a location to place the mobile terminal, and excellent usability is achieved in this regard.

Further, at the time of charging stop after the start of charging, in a case where it is determined that charging stop is caused by a reason other than the reason that the charging efficiency of the mobile terminal is lower than the set efficiency value, and the position of the mobile terminal which is detected by the detector and the position of the charging coil are separated from each other by the first set distance or more, the drive unit moves the charging coil to a portion corresponding to the position of the mobile terminal which is detected by the detector, and thereafter charging is resumed. Through this configuration, in a case where another mobile terminal is placed on the upper surface of the installation plate in a state where charging is stopped, the charging coil is moved again to the position of the mobile terminal, charging is resumed, and excellent usability is achieved in this regard.

Further, at the time of charging stop after the start of charging, in a case where it is determined that charging stop is caused by a reason that the charging efficiency of the mobile terminal is lower than the set efficiency value, and the position of the mobile terminal which is detected by the detector and the position of the charging coil are separated from each other by the second set distance or more, the drive unit moves the charging coil to a portion corresponding to the position of the mobile terminal which is detected by the detector, and thereafter charging is resumed, such that excellent usability is achieved in this regard.

In other words, during driving, since the mobile terminal is moved so as to generate position deviation from the charging coil, the charging efficiency decreases significantly, and thus charging stop is often generated. Therefore, during driving, since the driver is unlikely to be aware of such a charging stop, when the driver realizes the charging stop, a situation where charging is not possible may frequently occur, and this is indicated as poor usability.

Therefore, in a case where the charging efficiency is decreased, the reason for charging stop is caused, for example, by a reason that the mobile terminal is slightly moved on the upper surface of the installation plate, due to the vibration and inertia resulting from the driving of the automobile, such that in this case, if the position of the mobile terminal which is detected by the detector and the position of the charging coil are separated from each other by the second set distance or more, it is configured such that the drive unit moves the charging coil to a portion corresponding to the position of the mobile terminal which is detected by the detector, and thereafter charging is resumed.

Therefore, for example, since charging is performed while the charging is not inadvertently stopped during driving of the automobile or the like, excellent usability is achieved in this regard.

Therefore, the present invention is expected to be applied as the mobile terminal charging device for the automotive or home.

The invention claimed is:

1. A mobile terminal charging device comprising:
a body case having an installation plate disposed on an upper surface of the body case;
a detector that is provided on or below the installation plate, and detects a position of a mobile terminal that is present on an upper surface of the installation plate;
a charging coil that is movably disposed inside the body case, in a state of facing a lower surface of the installation plate;
a drive unit that moves the charging coil in a state of facing the lower surface of the installation plate;
a charging controller that is connected to the drive unit and the charging coil; and
a charging communication unit that is connected to the charging controller and communicates with the mobile terminal,
wherein, if a charging stop request and a stop reason are acquired from the mobile terminal, the charging controller stops charging and sets a determination distance between a position of the mobile terminal and a position of the charging coil to a first set distance or a second set distance which is less than the first set distance, depending on the stop reason, the determination distance being a reference to resume the charging, and
wherein, if a distance between the position of the mobile terminal which is acquired from the detector and the position of the charging coil is greater than the determination distance, the charging controller moves the charging coil to a portion corresponding to the position of the mobile terminal which is detected by the detector, using the drive unit, and thereafter resumes charging.

2. The mobile terminal charging device of claim 1, wherein the charging controller:
moves the charging coil in a state of facing the lower surface of the installation plate, using the drive unit, and thereafter resumes charging, at a time of charging start,
moves the charging coil to a portion corresponding to the position of the mobile terminal which is detected by the detector, using the drive unit, and thereafter resumes charging, in a case where it is determined that charging stop is caused by a reason that charging efficiency of the mobile terminal is lower than a set efficiency value, and the position of the mobile terminal which is detected by the detector and the position of the charging coil are separated from each other by the second set distance or more, at the time of charging stop after the start of charging, and
moves the charging coil to a portion corresponding to the position of the mobile terminal which is detected by the detector, using the drive unit, and thereafter resumes charging, in a case where it is determined that charging stop is caused by a reason other than the reason that the charging efficiency of the mobile terminal is lower than the set efficiency value, and the position of the mobile terminal which is detected by the detector and the position of the charging coil are separated from each other by the first set distance or more, at the time of charging stop after the start of charging.

3. The mobile terminal charging device of claim 2, wherein a retry counter is connected to the charging controller, and
wherein the charging controller performs a count input to the retry counter in a case where it is determined that charging stop is caused by a reason that the charging efficiency of the mobile terminal is lower than the set efficiency value, after the charging start of the mobile terminal, based on charging communication information from the charging communication unit, and ends resumption of power supply to the charging coil if a count number of the retry counter is a set count value or more.

4. The mobile terminal charging device of claim 3, wherein the charging controller:
stops power supply to the charging coil according to a stop request from the mobile terminal,
performs a count input to the retry counter, and thereafter resumes power supply to the charging coil, in a case where it is determined that the stop request is caused by a reason that the charging efficiency of the mobile terminal is lower than the set efficiency value, and
ends resumption of power supply to the charging coil if the count number of the retry counter is the set count value or more.

5. The mobile terminal charging device of claim 4, wherein the charging controller:
stops power supply to the charging coil according to a stop request from the mobile terminal,
performs a count input to the retry counter, and sets a movable reference of the charging coil to the second set distance, in a case where it is determined that the stop request is caused by a reason that the charging efficiency of the mobile terminal is lower than the set efficiency value,
moves the charging coil to the position of the mobile terminal which is detected by the detector, using the drive unit, and thereafter resumes power supply to the charging coil, in a case where it is determined that the position of the mobile terminal which is detected by the detector and the position of the charging coil are separated from each other by the second set distance or more, and
ends resumption of power supply to the charging coil if the count number of the retry counter is the set count value or more.

* * * * *